United States Patent Office 2,979,654
Patented Apr. 11, 1961

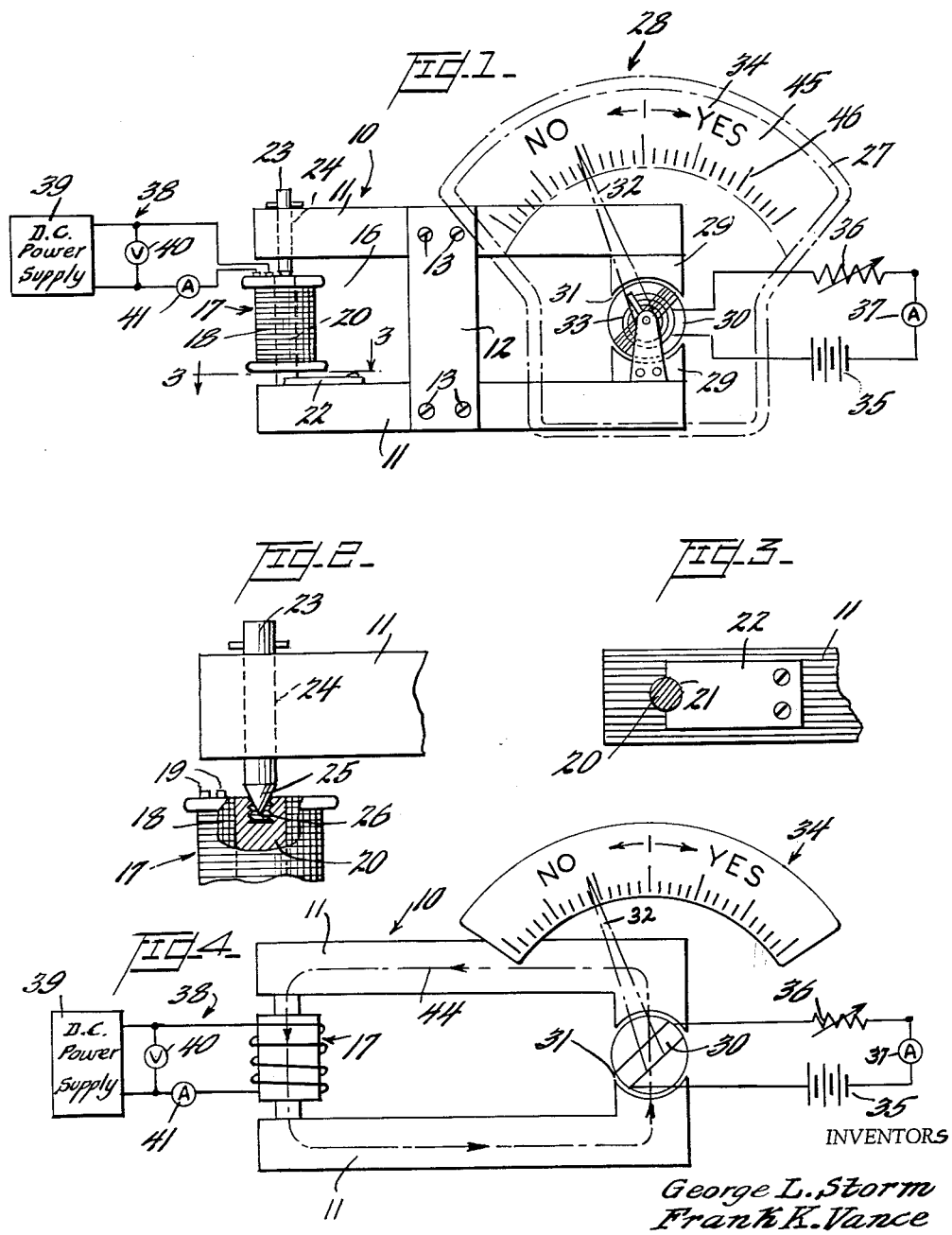

2,979,654
APPARATUS FOR TESTING MAGNETIC PROPERTIES OF MATERIALS

George L. Storm and Frank K. Vance, Winston-Salem, N.C., assignors to Western Electric Company, Incorporated, New York, N.Y., a corporation of New York Filed Sept. 26, 1957, Ser. No. 686,384
2 Claims. (Cl. 324—34)

This invention relates to apparatus for testing magnetic properties of materials and more particularly to apparatus for testing the magnetic properties of magnetic coil assemblies used in electrical relays.

Many coil assemblies, after being assembled into relays, are found to produce insufficient magnetic force to open or close a relay contact under specified electrical conditions. Manifestly, such defects discovered after the relays are placed in circuit operation are costly due to the work effort required to locate and replace the defective relays and to the loss of available circuit time. Accordingly, it is very desirable to have a simple device of the nature of a "Go-No Go" gauge, which may be used by a relatively unskilled operator to determine the sufficiency of the magnetomotive force produced by a coil assembly under operating conditions prior to the incorporation of the coil assembly into a relay.

Conventional acceptability tests for coil assemblies generally require a separate measurement of current plus a calculation to determine the magnetomotive force in ampere-turns, i.e., a rated current in amperes multiplied by the number of turns in the coil assembly. Such a test is not accurate as it does not take into account such factors as variations in the core material, the manner in which wire is wound about the core, or the like.

An object of this invention is to provide a new and improved apparatus for testing magnetic properties of materials.

Another object of this invention is to provide new and improved apparatus for testing the magnetic properties of magnetic coil assemblies.

A further object of this invention is to provide a new and improved apparatus for readily determining the sufficiency of the magnetomotive force produced by a coil assembly.

Apparatus illustrating certain features of the invention may include a magnetic structure having first and second gaps provided therein, means for detachably positioning in the first gap a coil assembly to be tested, means for energizing the coil assembly so as to set up a first magnetic flux across the second gap, means for establishing a second magnetic flux within the second gap, and means for indicating the magnitude of the interaction in the second gap of the first and the second magnetic flux.

A more complete understanding of the invention may be obtained from the following detailed description of apparatus forming a specific embodiment thereof, when read in conjunction with the appended drawings, wherein:

Fig. 1 is a front elevation of the apparatus with parts thereof, such as power supplies, shown schematically and a coil assembly illustrated in test position;

Fig. 2 is an enlarged, fragmentary view, partly in section, of a locating pin and adjacent portions of the coil assembly;

Fig. 3 is an enlarged, fragmentary, horizontal section taken along the lines 3—3 of Fig. 1 in the direction of the arrows; and Fig. 4 is a schematic representation of magnetic and electrical circuits of the apparatus under operating conditions.

Referring now to the drawings and more particularly to Fig. 1, there is shown a magnetic structure 10 including two legs 11—11 made of stacked laminations of a magnetic material, such as soft iron or the like. The legs 11—11 of the structure 10 are held in spaced parallel relationship by two spacers, one of which, designated 12, is shown in Fig. 1. The spacers 12—12 are made of a suitable non-magnetic material, such as brass, and are secured to the legs 11—11 by suitable threaded fasteners 13—13.

A gap 16 between the left-hand ends of the legs 11—11, as viewed in Fig. 1, is designed to receive a coil assembly, such as a coil assembly 17. The coil assembly 17 includes a predetermined number of turns of wire 18, the ends of which are brought out and connected to terminals 19—19, Fig. 2. The wire 18 is wound in a conventional manner in a plurality of helical layers about a central, cylindrical core 20 of a suitable magnetic material. One end of the core 20 is received partly within a complementary recess 21 formed in a stop 22 made of a non-magnetic material, which is attached fixedly to the bottom leg 11, as viewed in Fig. 3. The other end of the core 20 is held detachably by a locating pin 23 made of a magnetic material. As illustrated in Fig. 2, the locating pin 23 is slidably received closely within an aperture 24 provided in the top leg 11 and is provided with a conical tip 25. The conical tip 25 may be inserted within a threaded bore 26, ordinarily tapped in the adjacent end of a conventional core such as the core 20. In this arrangement the conical tip 25 aligns the core 20 and maintains a minimum, reproducible air gap between any core under test and the locating pin 23.

A permanent magnet of a D'Arsonval-type ammeter 28, such as a Western Electric ammeter model D–166824, is removed and is replaced by the magnetic structure 10. The right-hand ends of the legs 11—11, of the core structure 10, are inserted through apertures (not shown) formed in a casing 27, of non-magnetic material, and are suitably secured, by a weld or the like, to soft iron pole pieces 29—29 as may be seen in Fig. 1.

The ammeter 28 has a moving-coil 30 rotatably mounted in conventional manner on suitable bearings within the casing 27, such that the moving-coil 30 is received closely within an air gap 31 between the pole pieces 29—29. An indicating needle 32 is secured to the moving-coil 30 for movement therewith. Controlling force is provided for the moving-coil 30 in conventional manner by two spiral springs 33—33, one spring 33 being secured to the front and the other spring 33 being secured to the rear of the moving-coil. The spiral springs 33—33 are made of a suitable non-magnetic, electrically conductive material.

The moving-coil 30 is connected in series with a D.C. power supply 35, a variable resistor 36, and an ammeter 37. The connections between the ends of the moving-coil 30 and the series-connected resistor 36, power supply 35, and ammeter 37 are through the springs 33—33 attached to the moving-coil.

A magnetic coil assembly 17 under test has its terminals 19—19 connected to a coil energizing circuit 38. The coil energizing circuit 38 includes a conventional D.C. power supply 39 which is variable so as to permit the adjustment of the energizing current for the coil assembly 17. Operating conditions may be simulated by varying the D.C. power supply 39 and observing a voltmeter 40 and an ammeter 41.

*Calibration*

The apparatus may be calibrated by using a standard coil assembly, e.g., a coil assembly 17, that has proven to function satisfactorily when assembled into a relay and placed in a circuit. The standard coil assembly 17 is positioned in the gap 16 of the magnetic structure 10 and secured therein, as illustrated in Fig. 1.

As may be seen in Fig. 4, the coil energizing circuit 38 is connected to the terminals 19—19, Fig. 2, of the standard coil assembly 17 and a predetermined current, preferably the operating current of the relay, is passed through the standard coil assembly by varying the D.C. power supply 39 and observing the ammeter 41. Energization of the standard coil assembly creates a magnetomotive force within the coil assembly which in turn sets up a magnetic flux 44 through the magnetic structure 10, across the air gap 31, and through the moving-coil 30.

Another predetermined current is established in the conductors of the moving-coil 30 by adjusting the variable resistor 36 and observing the ammeter 37. The variable resistor 36 is provided so that a reading on the scale 34 of an ammeter 28 may be adjusted to any portion of the scale. Further, by establishing various predetermined currents, the same reading on the scale 34 can be used for coil assemblies of different numbers of turns, e.g., coil assemblies are mass produced at various numbers of turns, i.e., 5,000 turns, 10,000 turns, etc.

With the apparatus energized as described above, an interaction will occur between the flux 44 and the current carrying moving-coil 30 to cause the moving-coil 30 to rotate an amount proportional to the amount of magnetomotive force produced by the energized standard coil assembly 17. The angular rotational displacement of the moving-coil 30 is indicated by the indicating needle 32. The lower limit of the Yes region 45 of the scale 34 is then defined by the reading of the indicating needle 32 in response to the magnetomotive force produced by a standard coil assembly.

The subject device can be calibrated to read absolute values of flux or lines of magnetic force per unit area, on a graduated scale 46, by the use of a standard solenoid and a ballistic galvanometer.

*Operation*

In order to facilitate a description of the above described apparatus, let it be assumed an operator desires to determine the acceptability of a coil assembly 17, i.e., the amount of magnetomotive force the coil assembly will produce when energized with predetermined values of current and voltage, prior to assembling the coil assembly into a relay. Further, it is assumed that the power supplies 35 and 39 are properly adjusted by prior calibration with a standard coil of the specific type of the coil assembly under test.

The operator then takes the coil assembly 17 and places it in the gap 16 of the magnetic structure 10. The coil assembly 17 is securely positioned, bridging the air gap 16, by placing the bottom of the central core 20 in the recess 21 of the stop 22 and the top of the coil assembly is positioned by sliding the locating pin 23 through the aperture 24, in the top leg of laminations 11, and thrusting the conical portion of the locating pin 23 into the threaded bore 26 tapped in the top of the coil assembly. It will be understood that each coil assembly 17, as the type exemplified, is manufactured with threads tapped into the central core to provide a means for mounting the coil assembly in a relay. The operator then connects the coil energizing circuit 38 to the terminals 19—19 of the coil assembly 17 by some expeditious means, such as alligator clips, to energize the coil assembly.

Upon being energized, a magnetomotive force is produced by the coil assembly 17 which establishes flux 44 within the magnetic core 10, the path of which extends from the energized coil assembly 17 through the magnetic core 10, the pole pieces 29—29, across the air gap 31 and through the moving-coil 30. A field of flux is thus set up around the current-carrying conductors of the moving-coil 30, which results in a force acting on the conductors of the moving-coil. The resultant force rotates the moving-coil 30 angularly against the controlling force of the springs 33—33 by an amount proportional to the amount of magnetomotive force produced by the energized coil assembly 17.

The operator may then readily determine the acceptability of the coil assembly 17 by observing whether or not the indicating needle 32 rests in the predetermined Yes region 45 on the scale of the ammeter 28. If the indicating needle 32 comes to rest in the No region of the ammeter scale 34, the coil assembly 17 is not acceptable and conversely if the indicating needle rests in the Yes region 45 of the scale, the coil assembly is acceptable.

The coil assembly 17 is then removed and the operator repeats the above cycle of operation for testing additional coil assemblies.

The test, as hereinabove described, is most comprehensive as the magnetomotive force, indicated by the ammeter 28, reflects the totality of the individual electrical characteristics of each coil assembly as it is tested, e.g., the reluctance of the core, and the resistance of the coil winding.

The above-described apparatus can be readily modified to test magnetic core samples, i.e., a magnetic core such as core 20 before being incorporated into a coil assembly. This modification is achieved by modifying the coil energizing circuit 38 to include a coil of a predetermined number of turns connected to the leads of the energizing circuit, which coil would then be placed coaxially over the magnetic core samples. The core samples are then placed in the gap 16 of the present apparatus and tested in the hereinabove described manner.

The above-described embodiments of the invention are merely illustrative and numerous modifications may be made within the spirit and scope of the invention. The particular coil assembly illustrated is only an example of one type of coil assembly which may be operated upon in practicing the invention, and the invention is not limited to use with this particular type of coil assembly.

What is claimed is:

1. An apparatus for testing the magnetic properties of a coil assembly having a core of magnetic material and a coil winding surrounding the core coaxially, which apparatus comprises a magnetic structure having first and second gaps provided therein, means for mounting a coil assembly removably within the first gap with the core thereof bridging said last-mentioned gap, said mounting means including a substantially cylindrical locating pin slidably mounted in the magnetic structure and having a portion of one end thereof tapered for insertion into a bore provided in one end of the core of the coil assembly so as to align the core within the first gap and a stop having a complementary recess therein for positioning the opposite end of the core, a D.C. source connected to the coil winding for energizing the same, means for adjusting the energizing current to establish a predetermined current value in the coil winding whereby a magnetic flux is set up within the core, the magnetic structure, and across the second gap, a sensing coil mounted rotatably in the second gap, resilient means cooperating with the rotatable coil for resisting rotational displacement of the coil with a predetermined controlling force, a second D.C. source connected to the rotatable coil for energizing the same, means for adjusting the second energizing current to establish a second predetermined current value in the rotatable coil, and means for indicating the magnitude of rotational displacement of the rotatable coil resulting from an interaction between the current in said rotatable coil and the magnetic flux across the second gap, said last-mentioned means including an indicating needle attached to the sensing coil for angular rotation therewith, and a scale mounted adjacent to the indicating needle from which the angular displacement of the rotatable coil can be used.

2. An apparatus for testing the magnetic properties of a coil assembly having a core of magnetic material and a coil winding surrounding the core coaxially, which apparatus comprises a magnetic structure having first and second gaps provided therein, said magnetic structure including two legs of magnetic material held in spaced parallel relationship by non-magnetic spacer supports, means for mounting a coil assembly removably within the first gap with the core thereof bridging said last-mentioned gap, said mounting means including a substantially cylindrical locating pin slidably mounted having a portion of one end thereof conically shaped for insertion into a threaded bore tapped in one end of the core of the coil assembly so as to align the core within the first gap and a stop having a complementary recess therein for positioning the opposite end of the core, a D.C. source connected to the coil winding for energizing the same, means for adjusting the energizing current to establish a predetermined current value in the coil winding whereby a magnetic flux is set up within the core, the magnetic structure, and across the second gap, a sensing coil mounted rotatably in the second gap, pole pieces secured in a predetermined spaced relationship to opposite legs of stacked laminations in the second air gap such that the space between the pole pieces is shaped to closely receive said rotatable coil, resilient means cooperating with the rotatable coil for resisting rotational displacement of the coil with a predetermined controlling force, a second D.C. source connected to the rotatable coil for energizing the same, means for adjusting the second energizing current to establish a second predetermined current value in the rotatable coil, and means for indicating the magnitude of rotational displacement of the rotatable coil resulting from an interaction between the current in said last-mentioned coil and the magnetic flux across the second gap, said last-mentioned means including an indicating needle attached for angular rotation therewith, a scale mounted adjacent to the indicating needle from which the angular displacement of the rotatable coil can be read.

References Cited in the file of this patent

UNITED STATES PATENTS

| | | |
|---|---|---|
| 1,666,309 | Ray | Apr. 17, 1928 |
| 1,682,435 | Spooner | Aug. 28, 1928 |
| 2,318,923 | Clark | May 11, 1943 |
| 2,489,066 | Wiig | Nov. 22, 1949 |

FOREIGN PATENTS

| | | |
|---|---|---|
| 759,627 | Germany | June 21, 1954 |